United States Patent [19]

Carpenter et al.

[11] 4,388,094
[45] Jun. 14, 1983

[54] METHOD AND APPARATUS FOR PRODUCING TUBULAR GLASS ARTICLE

[75] Inventors: Larry L. Carpenter, Corning; Thomas G. Parham, Elmira, both of N.Y.

[73] Assignee: Corning Glass Works, Corning, N.Y.

[21] Appl. No.: 332,546

[22] Filed: Dec. 21, 1981

[51] Int. Cl.³ .......................................... C03C 25/02
[52] U.S. Cl. ...................................... 65/3.12; 65/18.2; 65/144; 65/168; 118/729; 118/730; 427/163
[58] Field of Search .................... 65/3.12, 18.2, 168, 65/144; 118/729, 730; 427/163

[56] References Cited

U.S. PATENT DOCUMENTS

| 3,620,704 | 11/1971 | Gray | 65/141 |
| 4,198,223 | 4/1980 | Goell et al. | 65/3.12 |
| 4,310,339 | 1/1982 | Blankenship | 65/3.12 |

FOREIGN PATENT DOCUMENTS 54-9947  1/1979  Japan ..................... 65/3.12

*Primary Examiner*—Robert L. Lindsay, Jr.
*Attorney, Agent, or Firm*—W. J. Simmons, Jr.

[57] ABSTRACT

Disclosed are a method and apparatus for forming a continuous length of glass article. A coating of glass particles is deposited on a mandrel having a thermal coefficient of expansion much greater than that of the glass particles. The mandrel is allowed to cool, thereby causing it to shrink and separate from the coating. The coating is indexed a discrete longitudinal distance along the mandrel, thereby uncovering a region of the mandrel. Another coating of glass particles is deposited on the uncovered region of the mandrel and over a portion of the previously applied coating. The steps of separating or freeing the coating from the mandrel, longitudinally indexing the coating with respect to the mandrel and depositing another coating are repeated. Thus, each step of indexing longitudinally translates an incremental length of a porous body from the end of the mandrel.

18 Claims, 11 Drawing Figures

METHOD AND APPARATUS FOR PRODUCING TUBULAR GLASS ARTICLE

BACKGROUND OF THE INVENTION

This invention relates to a method of continuously forming high purity glass articles such as tubing and optical waveguide preform. The preform can be severed into discrete draw blanks or continuously drawn into optical fiber.

Generally optical waveguides are made by either outside or inside vapor phase oxidation as hereinafter more particularly defined. In the inside vapor phase oxidation process a coating of glass is deposited on the inside surface of a glass substrate tube. The structure so formed is thereafter heated, the inner hole collapsed, and drawn into an elongated fiber which comprises the optical waveguide. The inner deposited coating of such a process comprises the core of the waveguide while the tubular starting member comprises the cladding. Commercially available glass substrate tubes are generally drawn from a melt and thus contain impurities which result from impure starting materials or impure melting containers. Barrier layers are often deposited in such tubes prior to the deposition of the light-conducting core material to minimize the effect of such impurities on the performance of the resultant optical waveguide fiber.

In the outside vapor phase oxidation process, a starting rod or tube is used as a starting member, bait, or mandrel, on the outside surface of which is deposited one or more layers of suitable material. Ordinarily, the starting member or mandrel is removed leaving the deposited structure as a tubular preform for the subsequent waveguide. The center hole must thereafter be closed before or during drawing, and a solid elongated waveguide fiber is drawn. In the outside process, either the starting rod forms the core of the ultimate waveguide or the first deposited layers form the core of the ultimate waveguide, while the latter deposited layers form the cladding thereof.

DESCRIPTION OF THE PRIOR ART

A substantially continuous method of forming an article suitable for an optical waveguide preform wherein the starting member is continuously removed is disclosed in U.S. Pat. No. 4,310,339 entitled "Method and Apparatus for Forming an Optical Waveguide Preform Having a Continuously Removable Starting Member," filed June 2, 1980 in the name of M. G. Blankenship. In accordance with the teachings of that application the preform is formed by applying particulate material to the exterior surface of a mandrel to form a coating thereon. The coating is longitudinally translated while additional particulate material is applied to that end of the preform that is still on the mandrel, the preform being continuously longitudinally translated away from the mandrel. In effect, the mandrel is continuously removed from the preform, thereby leaving a longitudinal aperture therein. The preform can be consolidated to form a glass tube that can be used as the substrate tube in the inside vapor phase oxidation process. Alternatively, the particulate material may be applied by one or more burners, the output of which may be controlled to provide a predetermined desired cross-sectional compositional variation of the resulting preform body. The so-formed preform may thereafter be suitably heated, consolidated, and drawn into an optical waveguide.

In the continuous process of the aforementioned Blankenship patent a relatively thick preform wall must be continuously formed, thereby limiting the rate of preform production. If the rate at which the preform is longitudinally translated from the mandrel is increased, a much thinner wall is formed. This thin initial wall must still have adequate strength to overcome the adhesion of the soot to the mandrel. Even for a relatively smooth, tapered mandrel, the adhesion of the soot to the mandrel appears to be greater than the strength of the very thin layer of soot, the thickness of which is only tens of micrometers. A second rate limitation results from the very small area of the mandrel where new wall can be formed, i.e. at the very tip of the mandrel. Growth can only be maintained as long as this exposed mandrel region is small enough that every soot particle laid down has adjacent to it or above it another soot particle which is attached to the growing preform through a chain or matrix of particles. The length of mandrel over which this condition can be met is thought to be small, i.e. less than 1 mm. Since the deposition zone of a standard burner is greater than 10 mm, only a small fraction of the 4 or 5 gr/min. soot available can actually go into new wall formation. Thus the maximum rate is again limited, in this case by surface area available for new wall formation. Both limitations would be less severe if a dramatic increase in single burner deposition rate could be achieved, or if a very large diameter soot tube were made so that slow linear pull-off is not an important consideration.

A method for forming and drawing fused metal-oxide tubes is taught in U.S. Pat. No. 3,620,704 issued to F. L. Gray. In accordance with the method of that patent, a fused silica tubing is formed by depositing a plastic vitreous mass of a metal oxide on a deposition zone of a selectively shaped, vertically suspended mandrel by vapor phase hydrolysis, heating the thus deposited metal oxide to a temperature sufficiently high to form a viscous glass melt or boule, rotating the mandrel about its vertical axis, continuously drawing a solid tube-like structure downward from the plastic oxide mass surrounding the lower end of the mandrel, and cooling the drawn structure to a temperature below which it becomes rigid. The lower portion of the mandrel is so shaped as to prevent the plastic glass melt from sliding off the deposition zone; rather, the tube is drawn from an accumulated boule or mass in a manner well known in the art of glass drawing.

Continuous optical fiber perform fabrication is described in U.S. Pat. No. 4,062,665 issued to T. Izawa et al. In accordance with the method of that patent, a refractory starting member is rotated and at the same time moved along the axis of rotation. A glass raw material for the formation of the core of a porous preform is introduced into a high temperature region near the tip of a burner from a nozzle aligned with the center of rotation of one end surface of the starting member. The glass raw material is caused by the flames of the high temperature burner to react to produce fine glass particles, which are deposited on the surface of the starting member at the central portion thereof in its axial direction to form a porous core. At least one nozzle for spraying a cladding glass raw material is disposed opposite to the end face of the starting member but a little deviated from the axis of rotation thereof, or it is disposed opposite to the peripheral surface of the porous core. The cladding glass raw material reacts to form fine glass particles, which are deposited on the surface of the starting member on the outside of the porous core or on the peripheral surface thereof at the same time as the formation of the latter, thereby forming a porous cladding. The porous preform thus obtained is moved into a high temperature furnace provided on the path of movement of the preform for consolidation thereof into an optical fiber preform. In this connection, reference is also made to the publication "Continuous Fabrication of High Silica Fiber Preform" by T. Izawa, S. Kobayashi, S. Sudo, and F. Hanawa, 1977 International Conference on Integrated Optics and Optical Fiber Communication, July 18–20, 1977, Tokyo, Japan, Technical Digest, pp. 375–377. The Izawa et al. patent and publication teach a continuous fabrication method for making a multimode step index or graded index perform by vapor phase axial deposition. This is a process in which the center bait rod is eliminated and both the core and the cladding glass are deposited continuously.

Continuous optical fiber fabrication is also taught by British patent application No. 2,009,140 by G. Cocito wherein a vitreous rod is heated to its softening point and drawn into a fiber at one end while powdered vitreous or vitrifiable material is continuously deposited onto an end of the rod remote from the drawn end. The deposited material is subjected to ion implantation as it is being deposited so as to produce a desired radial and axial refractive index distribution in the resulting fiber.

SUMMARY OF THE INVENTION

It is therefore an object of this invention to provide a method of rapidly forming a continuous high purity glass tube, a preform for an optical fiber, or an optical waveguide fiber.

Briefly, the apparatus of the present invention comprises means for applying particulate material to the exterior surface of at least a portion of a mandrel to form a hollow porous article, and means for indexing the article in a stop-and-go fashion, whereby the article remains in a longitudinally fixed position with respect to the mandrel between brief periods during which the article is longitudinally moved to its next position with respect to the mandrel.

In accordance with the present invention, a continuous length of article is produced as follows. Particulate material is applied to a portion of the exterior surface of the mandrel to form a first coating thereon. There is no relative longitudinal movement between the coating and the mandrel while the coating is being applied. As the mandrel cools it shrinks and frees the coating. The coating is then indexed a discrete longitudinal distance with respect to the surface of the mandrel to expose a region of the mandrel which had previously been covered with particulate material. Another coating of particulate material is deposited onto the exposed region of the mandrel and over at least a portion of the previously applied coating. Thereafter, the steps of freeing the coating from the mandrel, indexing the coating and depositing another coating are repeated. In this manner, each time that the buildup of coating material is indexed, an incremental length of a porous body is longitudinally translated from the end of the mandrel.

DETAILED DESCRIPTION OF THE INVENTION

It is to be noted that the drawings are illustrative and symbolic of the present invention and there is no intention to indicate scale or relative proportions of the elements shown therein. For purposes of simplicity, the present invention will be described in connection with the substantially continuous formation of tubing, the formation of an optical waveguide preform and the formation of the waveguide fibers themselves, although this invention is not intended to be limited thereto.

Figure 1:
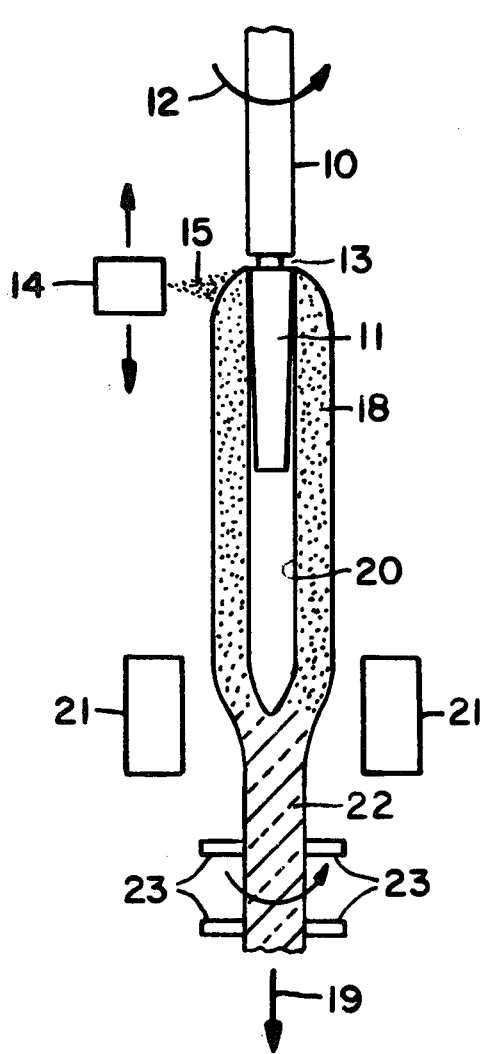
FIG. 1 is a fragmentary elevational view in partial cross-section illustrating a prior art apparatus for continuously forming an article.

Referring to FIG. 1, there is shown a prior art apparatus for continuously forming a soot preform. A mandrel 10 having a tapered end 11 is connected to any means known in the art (not shown) for rotation about its longitudinal axis as indicated by arrow 12. Mandrel 10 may be hollow or have internal channels such that gas can be passed through it. Mandrel 10 may have an annular opening 13 or an annular ring of holes or orifices for the purpose of exhausting a gas during the process of applying or depositing a coating 18 to prevent deposition of particulate material on mandrel 10 at a location beyond that where the article is being deposited.

A coating 18 of oxidic particulate material, which will ultimately form an article such as an optical waveguide preform, is then deposited by means of one or more burners 14 on the surface of tapered end 11 of mandrel 10. Any burners or similar means which provide a stream of oxidic particulate material that can be directed to the mandrel are suitable. For an illustration of a suitable burner, reference is made to U.S. Pat. Nos. 3,565,345 and 4,165,223. The term "burner" as used herein shall include any means suitable for generating and depositing particulate material including means for non-fuel fired heating of particulates using electrical resistance heating, plasma heating, induction heating, laser heating and the like.

The particulate material 15 which forms coating 18 may be any suitable material, as for example, in the formation of an optical waveguide preform, material suitable for the core and cladding of an optical waveguide. Suitable means for delivering constituents to burner 14 may be any means known in the art, for an illustration of which reference is made to U.S. Pat. No. 4,212,663 to M. A. Aslami and U.S. Pat. No. 4,173,305 to M. G. Blankenship, which patents are hereby expressly incorporated by reference.

The method of forming preform 18 is initiated by covering tapered end 11 with the desired thickness of particulate material by traversing the burner along the entire length of end 11. The end of the preform is then grasped by a mechanism employed to pull it from the mandrel in the direction of arrow 19. The burner is then positioned at the tip end of the preform as shown in FIG. 1 and is oscillated a small distance, e.g. about 1.3 cm, while the coating is pulled off the mandrel at a slow, continuous rate, thereby continuously forming a preform having a longitudinal aperture 20. Preform 18 may enter a heating zone illustrated by heaters 21 where the particulate material is consolidated into a glass body 22 in which the central aperture 20 may or may not be closed, depending upon the heat treatment and the composition of preform 18.

Also illustrated is a means 23 for supporting, rotating, and translating the preform as it is being formed. Rotation of the preform may be in the same direction as the rotation of mandrel 10 or may be in the opposite direction. Means 23 may comprise, for example, a plurality of rollers surrounding preform 22 and mounted so as to support, rotate and longitudinally translate the preform. Such support roller means are well known in the art and are described in greater detail in the aforementioned Blankenship patent.

The process described in conjunction with FIG. 1 is capable of producing a particulate material preform at a maximum rate of about 10 cm/hr. Attempts to dramatically increase the pull-off rate resulted in preform breakage. When the process is operated at a sufficiently slow rate, as the end of the mandrel is uncovered by continuously removing the preform, the mandrel is constantly being recovered with particles which must be built up to some minimum thickness. As the rate of preform removal is increased, the burner can form only a much thinner initial wall. This very thin initial wall must still have adequate strength to overcome the adhesion of the particulate material to the mandrel. Even for a relatively smooth, tapered mandrel, the adhesion of the particles appears to be greater than the strength of the very thin layer. Moreover, growth can only be maintained as long as the exposed mandrel region is small enough that every particle laid down has adjacent to it or above it another particulate which is attached to the growing preform through a chain or matrix of particles. Since the deposition zone of a standard burner is much larger than the region on which the deposition is to occur, only a small fraction of the particles available can actually go into new wall formation.

Figure 2:
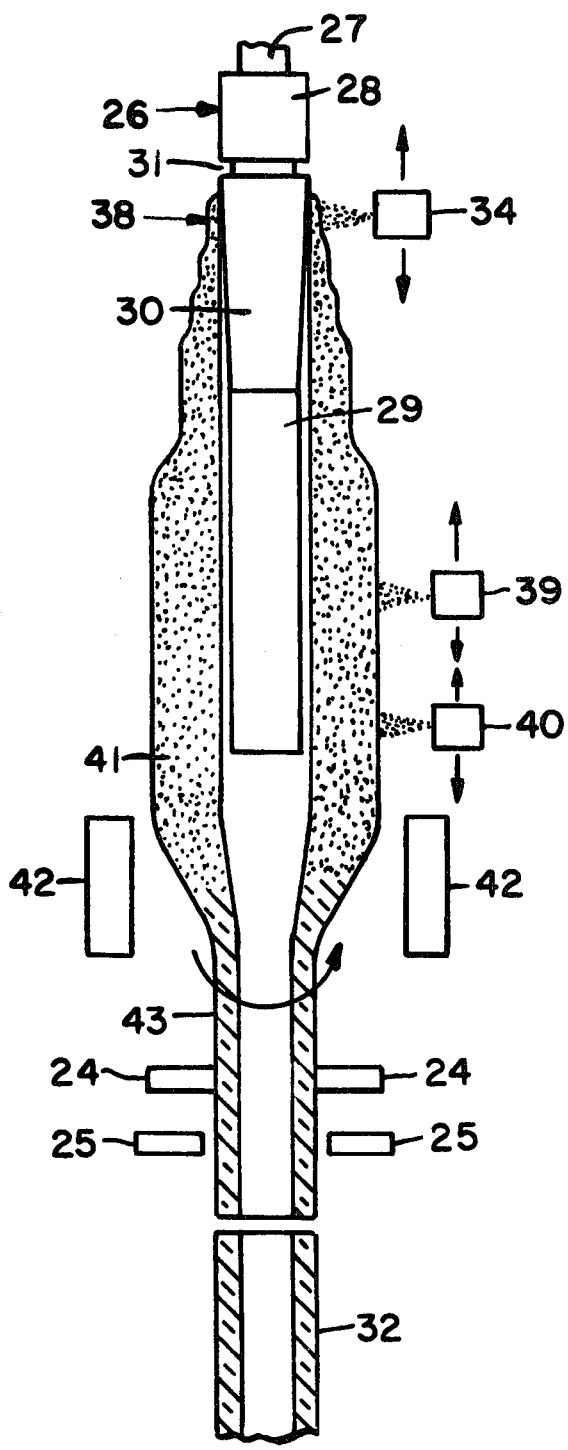
FIG. 2 is a fragmentary elevational view in partial cross-section illustrating an apparatus for forming articles in accordance with the method of the present invention.
Figure 3:
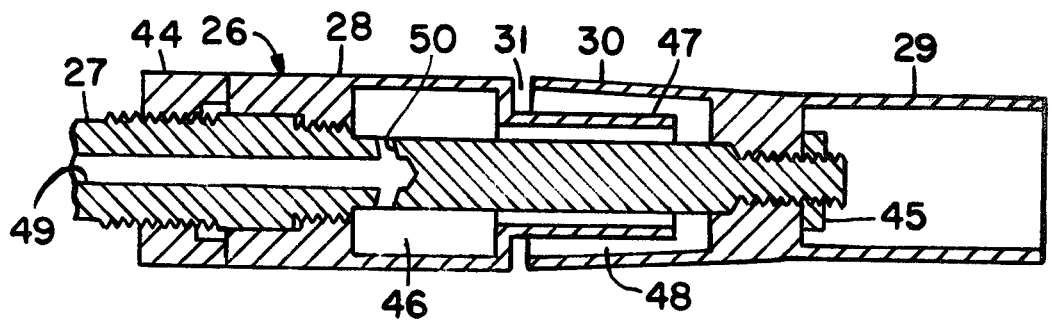
FIG. 3 is a fragmentary cross-sectional view of a mandrel employed in the apparatus of the present invention.

The apparatus of the present invention is illustrated in FIG. 2. Mandrel 26 comprises support member 27, non-tapered sections 28 and 29, and tapered section 30. Sections 28 and 30 are separated to provide a slot 31 from which a coolant fluid such as a gas or a liquid may be exhausted. Mandrel 26 is shown in greater detail in FIG. 3, wherein support member 27 is shown as comprising a shaft having a plurality of threaded sections for receiving mandrel sections 28, 29 and 30. Section 28 is secured to member 27 by nut 44, and sections 29 and 30, which are formed as a unit, are secured by nut 45. Sections 29 and 30 consist of tubular members extending in opposite directions from a solid central region which is threaded onto member 27. Section 28 includes a thin-walled portion, which forms a chamber 46, and a tubular extension 47 of smaller diameter which protrudes into the tubular portion of member 30 and forms therewith an annular channel 48. A bore 49, which extends into member 27, is connected to chamber 46 by apertures 50. A fluid or gas flowing into bore 49 flows through apertures 50, chamber 46, tubular extension 47 and channel 48 to slot 31. While flowing through channel 48, it cools section 30.

Mandrel sections 29 and 30 are formed of a material having a thermal coefficient of expansion (TCE) greater than that of the material deposited thereon. The TCE of the mandrel is preferably more than 1.5 times that of the deposited material. The surface must be smooth and resistant to corrosion from the high temperature soot deposition process. Suitable materials are platinum, rhodium, alumina, and other refractory materials. A pure platinum mandrel is preferred. A mandrel was actually constructed from stainless steel and then clad with a 0.25 mm thick platinum foil. The foil was hammer-welded to the mandrel and the seam was then polished down. Although some work was performed on carbon mandrels, carbon oxidizes at the temperature of operation and is therefore a poor mandrel material for long term use. A mandrel having a stainless steel surface was found to corrode after a single exposure to a flame and stream of particulate material.

Figure 4:
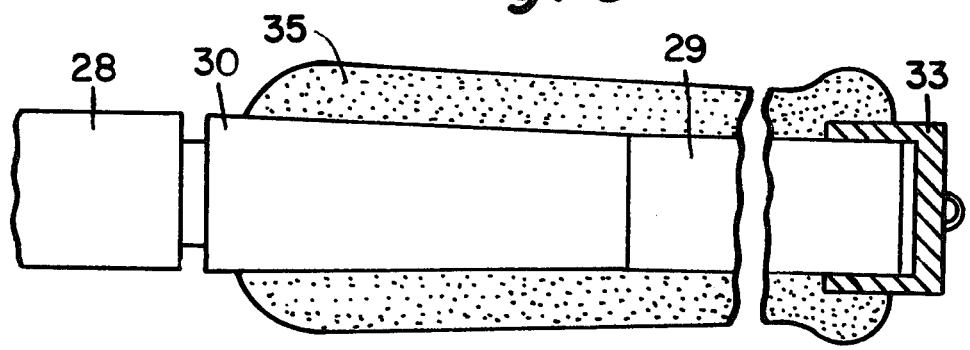
FIGS. 4, 5, 6 and 7 are fragmentary elevational views in partial cross-section illustrating successive steps to be performed in the commencement of the method of the present invention.

Reference is made to FIGS. 2, 4, 5 and 6 for a description of the initiation of the process of the invention. A preform attachment cup 33 is initially disposed over the end of mandrel section 29. One or more burners 34 are traversed back and forth along mandrel sections 29 and 30 to form thereon a relatively thick, hard coating 35 of particulate matter. A portion of coating 35 overlaps cup 33. The thickness of coating 35 must be sufficient to render it self-supporting. Coating 35 can be formed by depositing about 10-20 layers of particulate material, thereby building up a coating which is preferably at least 1 mm thick. By relatively hard coating is meant a coating having a density of greater than 0.4 gr/cc. By utilizing such a hard coating, relatively strong sections of preform can be laid down in very thin layers. It has been found that a hard coating having a total thickness of about 70 $\mu$m possesses sufficient strength to permit separation of the thin coating from the mandrel without breakage. The initially formed structure is illustrated in FIG. 4.

Figure 5:
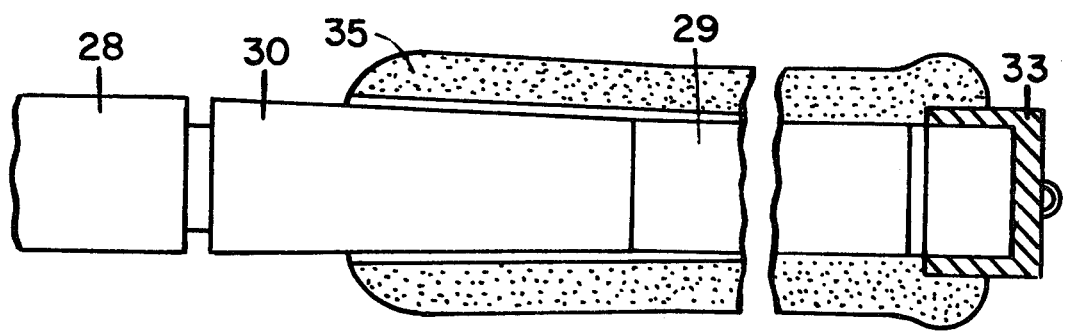
Figure 6:
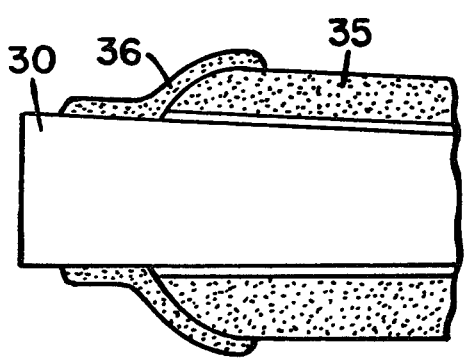

Because of the great difference in thermal expansion between the coating and the material of mandrel sections 29 and 30, the mandrel will shrink away from coating 35 when the temperature of the mandrel has been decreased by a sufficient amount below the deposition temperature. After coating 35 has been freed from the mandrel, it is indexed an incremental distance in the direction of the taper of portion 30 as illustrated in FIG. 5. This causes a portion of coating 35 to extend beyond the end of mandrel section 29 and causes a portion of the surface of tapered section 30 to be uncovered. The indexing distance is not critical, and one to two centimeters has been found to be adequate.

Burner 34 then traverses the exposed portion of tapered section 30 and overlaps coating 35, thereby forming a relatively thin coating 36. Coating 36 can be formed in the following manner. Burner 34 can be positioned adjacent to the end of tapered section 30 but directed away from the mandrel so that no deposition occurs. To deposit layer 36, the burner is directed toward the mandrel. Then it begins to traverse toward the narrow end of section 30 until the desired length of deposition has been achieved. It then reverses direction and forms a second layer of coating 36 until it again reaches the end of mandrel section 30 at which time it is again tilted away from the mandrel. The mandrel is again permitted to cool to cause it to shrink away from coating 36. The time required for thin coating 36 to be separated from the mandrel is much less than that required for separation of coating 35. Separation of layer 36 should occur within 10 seconds, and it may occur within a few seconds or less depending upon the thermal expansion coefficients of the mandrel and the particulate material, the thickness of the mandrel in the region of soot lay down, and the type of coolant employed, if any.

Figure 7:
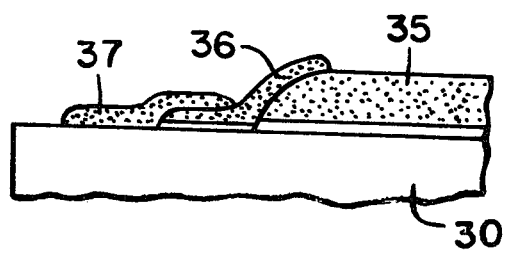

After the process has been initiated, the steps of cooling the mandrel, indexing the preform the mandrel and depositing a new layer of glass are continued indefinitely. As shown in FIG. 7, coatings 35 and 36 are indexed toward the narrow end of tapered section 30, after coating 36 has become separated from the mandrel by cooling the mandrel. Thereafter, the layer 37 is applied to the exposed portion of mandrel section 30 and the adjacent region of coating 36. Instead of merely overlapping the adjacent soot coating, the newest applied coating of soot can overlap two or more previously applied coatings as illustrated in FIG. 8 wherein the mandrel is omitted for the sake of simplicity.

In accordance with the foregoing discussion, the initially formed section 38 of porous preform is deposited on the mandrel. As shown in FIG. 2, section 38 may contain a plurality of steps, the number of which depends upon the number of previous coatings which are overlapped with each newly formed coating. In the region of non-tapered mandrel section 29, one or more burners 39 may be employed to deposit additional layers of particulate material onto initially formed preform section 38 as that section is indexed toward the end of the mandrel. The composition of the particulate material produced by burners 39 may be the same as that produced by burner 34 if a tube of uniform composition is to be formed. An optical waveguide preform could be formed by depositing particulate material having a first value of refractive index from burner 34 and depositing particulate material having a lower value of refractive index by burners 39 and 40. Alternatively, burner 39 and other burners disposed between burner 39 and burner 34 could be employed to deposit material of successively higher refractive index progressing from burner 39 to burner 34. Burner 40 and any other required burners could then be employed to deposit the cladding material.

The fully developed porous preform section 41 may be consolidated by passing it through heaters 42. In such an embodiment, consolidated glass article 43 may retain its aperture if desired, or the aperture may be collapsed to form a solid article.

Figure 8:
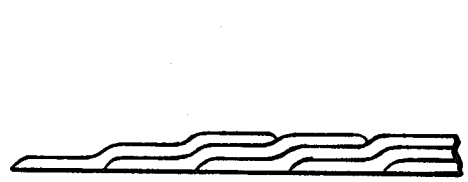
FIGS. 8 and 9 are fragmentary cross-sectional views illustrating different techniques for building up layers of particulate coating material on a mandrel.
Figure 9:
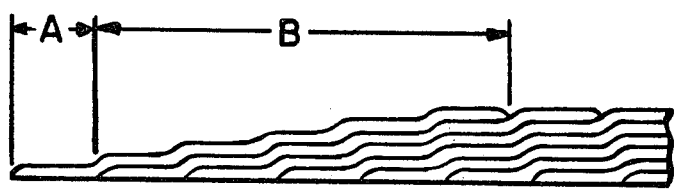

The embodiment of FIG. 8 illustrates the buildup which can result when burner 34 tilts away from the mandrel after a layer has been deposited on the exposed surface of the mandrel, and it remains directed away from the mandrel until a sufficient time has elapsed for the mandrel to cool and separate from the newly deposited layer and for the preform to index and expose the mandrel surface. In the embodiment illustrated in FIG. 9 the burner traverses region A to deposit a new layer of particulate material on the mandrel. It then traverses a sufficient number of previously applied layers shown as region B so that a sufficient amount of time has elapsed when the burner returns to region A that the last applied layer has separated from the mandrel and the preform has been indexed. Thus, the deposition efficiency of the burner is increased since the burner is continuously depositing particulate material.

Attachment cup 33 is not needed if the following procedure is employed. Mandrel sections 29 and 30 are coated with a plurality of layers of particulate material. The deposited coating is released from the mandrel by the aforementioned cooling technique, the coating is indexed about one centimeter and the uncovered portion of mandrel is provided with a thin coating which overlaps the end portion of the previous coating. The steps of releasing the coating, indexing the preform and recoating the exposed mandrel are repeated three times. After the final coating has been released from the mandrel, the preform is removed from the mandrel and four holes are drilled at 90 around the end of the first applied thick coating about 1.5 cm from the end thereof. Platinum wires are attached to the holes and the mandrel is replaced. Thereafter, the mandrel can be indexed by pulling the wire.

During the initial formation of the preform, cup 33 or the platinum wires at the end of the preform are mechanically grasped in order to index the preform while permitting it to rotate with mandrel 26. This initial connection is maintained until the preform is contacted by roller means 24 and 25 which automatically perform that function. Means 24 and 25 could alternatively be located so as to contact unconsolidated preform 41, or sets of such means could be located at both the unconsolidated and consolidated portions of the preform. Such support roller means are well known in the art as described above. The pitch of the two sets of rollers could be such that one set only rotated the preform at the rate of mandrel rotation without longitudinally moving the preform. The other set could be set at a pitch adequate to index the preform longitudinally while rotating it. At any given time, one set of rollers would be in contact with the preform, and the other set would be retracted. FIG. 2 illustrates that individual sections 32 could be severed from the consolidated preform.

Wheel means 24 and 25 could provide the preform with a constant longitudinal translation if the indexing action were performed by the mandrel. Mandrel 26 could rotate at a constant rate and move longitudinally at the same rate as the preform. The movement of burner 34 would be compensated to reflect the longitudinal motion of the mandrel. To index the preform with respect to the mandrel after the preform has been freed therefrom, the mandrel is moved away from the preform.

As indicated above sections 32 may be rods or tubes. If provided with the appropriate radial composition, the severed section could be drawn into an optical waveguide fiber.

Figure 10:
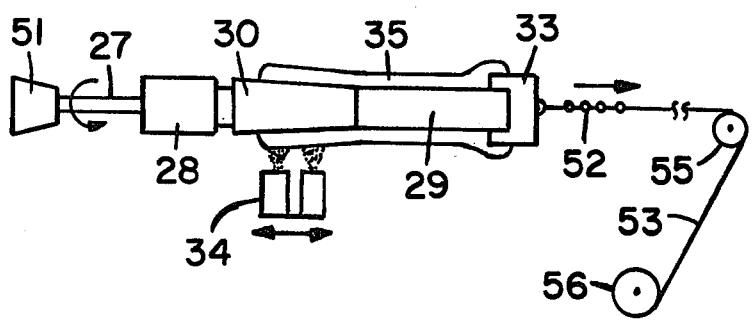
FIG. 10 is a schematic illustration of one embodiment of the present invention.

A simplified mechanism for indexing the preform is illustrated in FIG. 10. The mandrel which is illustrated in FIG. 4 is mounted in a chuck 51 which rotates it as illustrated by the arrow. A swivel connector 52 connects cup 33 to a fine stainless steel wire 53 which extends over pulley 55 to a motor driven capstan 56. A thick coating of particuate material is initially applied to mandrel sections 29 and 30 and to cup 33 in the manner described in conjunction with FIG. 4. After coating 35 is manually indexed, the slack is removed from wire 53 and capstan 56 is rotated slowly. The rate of rotation of capstan 56 can be adjusted so that wire 53 becomes sufficiently taut to apply an axial force to the preform which is sufficient to index the preform when the last applied thin coating has become released from the mandrel. A small amount of slack develops in wire 53 and swivel 52, thereby permitting the next thin coating to be deposited at the end of mandrel section 30 in the absence of an axial force on the preform. As the mandrel cools and shrinks away from the last applied coating, the wire has again become sufficiently taut to index the preform.

Since the new wall produced by burner 34 can be formed over the entire exposed surface by indexing the preform a few centimeters, much more of the available soot generated by the burner can go into new wall formation as compared with the continuous process illustrated in FIG. 1. The entire cycle time required for generating a thin coating on the few centimeter length of exposed mandrel, cooling to release the coating and indexing the coating has been performed in less than 30 seconds when nitrogen was employed as the coolant gas. Helium would provide a greater heat removing capacity. It is expected that the process could be readily automated to reduce cycle time to about 12 to 14 seconds. Liquid cooling of the mandrel would be expected to allow a reduction of the cooling time from 10 seconds to about 2 seconds. Experience has shown that a mandrel having a thin wall in the deposition region permits a faster thermal cycle time and provides more freedom for the substrate to become free from the coating. Thus, a total cycle time per index of 6 seconds for a 2 centimeter index is not at all unreasonable. Such a frequency would yield a porous preform pull-off rate of about 25 cm/min.

Silica tubes were produced by the process described in conjunction with FIG. 10. A nitrogen-cooled mandrel of the type shown in FIG. 3 was employed. The maximum outside diameter of tapered section 30 was 32 mm. Sections 29 and 30 were found of stainless steel having a 0.25 mm hammered platinum foil cladding. Two burners 34 were mounted together. The burner faces were located about 5 cm from the mandrel surface. Each of the burner faces had a 1.45 mm fume hole surrounded by three concentric rings of holes. In order of increasing radius were 12 inner shield holes having 0.56 mm diameters, 48 gas/oxygen holes having 0.86 mm diameter holes and twenty four 0.86 mm diameter outer shield holes. Fuel gas and burner oxygen were supplied to the burner at rates of 6.5 SLPM and 5.5 SLPM, respectively. Oxygen was supplied to the inner and outer shield holes at rates of 2.5 SLPM and 3.0 SLPM, respectively. A bubbler containing $SiCl_4$ was maintained at a temperature of 50 C. Oxygen flowed through the bubbler at a rate of 1.6 SLPM to provide a reactant gas mixture which was fed to the fume holes. The mandrel rotation rate was 211 RPM and the burner traverse rate was 1.8 cm/min.

The mandrel was initially covered with 5 layers of particulate material for startup. The mandrel was cooled for 10 minutes in order to free the preform from the mandrel. The porous preform was indexed about 0.1 cm. The exposed surface of the mandrel was covered with two layers of soot, the burner traversing at a rate of 1.0 cm/sec. This latter coating overlapped about 0.9 cm of the originally applied coating. The total thickness of the two layers of particulate material covering the exposed portion of the mandrel was about 70 $\mu$m. The mandrel was cooled for about 10 seconds and the porous body was indexed about 0.1 cm. The steps of covering the exposed mandrel surface, cooling and indexing were repeated until a porous preform having a length of about 10 cm was produced.

Four porous tubes formed in accordance with the above described process were consolidated in a standard consolidation furnace at 1560° C. at a downfeed rate of 0.5 cm/min. The tubes consolidated fully and exhibited a surprisingly low amount of distortion. The resulting tubes had an outside diameter of 25 mm and a wall thickness of 2.8 mm. The tubes had a 0.98 siding and a 0.96 out-of-round. The term "siding," which is used to describe nonuniformity of tube wall thickness, is defined as minimum wall thickness divided by maximum wall thickness. The tube out-of-round is defined as the minimum outside diameter divided by the maximum outside diameter.

A discrete ring from the original indexing movement followed through and remained in the final product. There was an oscillating outside diameter pattern wherein the variation in diameter over a 2 mm longitudinal distance was 20 $\mu$m. This pattern was barely visible as a slight surface ripple. The inside surface was more affected by the indexing, the result being a slightly frosty look. The inner surface included discrete dips of 20 $\mu$m running around the tube as a result of the original indexing. When the original tube was redrawn to a diameter of 60% of its original glass diameter, both the discrete rings and the small surface defects were completely healed. Certain defects which were not healed by the re-draw treatment should be avoidable by improvement of the mandrel surface. These defects are essentially lumps of soot which came off the mandrel unevenly due to the roughness of the mandrel surface. The platinum-clad mandrel employed in the aforementioned example was of much lower surface quality than could be achieved with a machined platinum mandrel.

Figure 11:
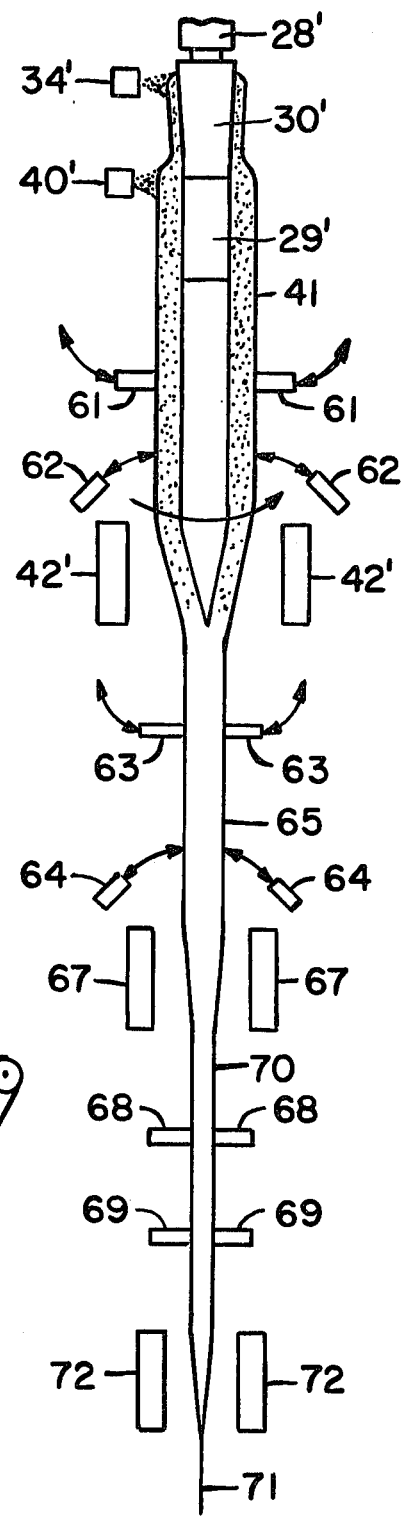
FIG. 11 is a fragmentary elevational view in partial cross-section illustrating an apparatus for forming optical fibers.

In the embodiment illustrated in FIG. 11, wherein elements similar to those of FIG. 2 are represented by primed reference numerals, the preform is formed, consolidated and drawn into an optical waveguide fiber in a single operation. By appropriate application of particulate material, the desired cross-sectional compositional variation could be achieved. The preform indexing function is performed by rollers 61 and 62 which are capable of swiveling in the direction of the arrows. Rollers 61 rotate but do not longitudinally translate the mandrel during the deposition portion of the cycle. For the indexing portion of the cycle, rollers 61 swivel away from the preform and rollers 62 swivel into contact with the preform. The pitch of rollers 62 is relatively steep so that they quickly translate the preform longitudinally while continuing to rotate the preform at the same rotational rate. Additional burners (not shown) may be provided for heating the porous preform prior to the time that it enters consolidation furnace 42'. Additional sets 63 and 64 of rollers engage the consolidated preform after it emerges from furnace 42'. The pitch of rollers 63 may be such that consolidated preform 65 is slowly translated longitudinally while soot preform 41 is merely rotating. The pitch of rollers 64 may be greater than that of rollers 63 so that they translate consolidated preform 65 at a slightly greater longitudinal rate during the time that porous preform 41 is being indexed. This reduces the amount of variation in the longitudinal translation of consolidated preform 65.

Preform 65 could be drawn directly into an optical waveguide fiber. Even though that preform has diameter variations and is moving at an irregular rate, the fiber formed therefrom can be drawn at an irregular rate in order to obtain a relatively constant diameter through the use of feedback control of draw speed. If the fiber is drawn directly from preform 65, it is preferred that heating means 67 be relatively long. However, because of the nonuniformity of diameter and longitudinal feed rate, it may be desirable to draw preform 65 into a fiber in a two-step operation as illustrated in FIG. 11. Rollers 68 and 69 may be in continuous contact with intermediate fiber 70, thereby pulling it at a constant rate from heating means 67. Intermediate fiber 70 passes through heating means 72 where it is heated to a temperature sufficiently high to permit a fiber 71 to be drawn therefrom by conventional tractor means (not shown).

I claim:

1. A method of forming a continuous length of article comprising the steps of
   providing a mandrel,
   applying particulate material to at least a portion of the exterior surface of said mandrel to form a first coating thereon, there being no relative longitudinal movement between said coating and said mandrel during the step of applying particulate material to said mandrel,
   freeing said coating from said mandrel,
   indexing said coating a discrete longitudinal distance with respect to the surface of said mandrel to expose a region of said mandrel which had previously been covered with particulate material,
   depositing another coating of particulate material by applying particulate material onto said exposed region of said mandrel while the longitudinal position of said mandrel remains stationary with respect to said coating and by applying particulate material over at least a portion of the previously applied coating, and
   repeating the steps of freeing, indexing and depositing, whereby each step of indexing longitudinally translates an incremental length of a porous body from the end of said mandrel.

2. The method of claim 1 wherein the steps of applying and depositing are performed by directing at least one burner-produced stream of particulate material toward said mandrel.

3. The method of claim 1 further comprising the step of heating the body so formed to consolidate said particulate material.

4. The method of claim 1 further comprising the step of applying at least one additional coating of particulate material on a portion of said porous body separated from said another coating.

5. The method of claim 4 wherein the compositions of said another coating of particulate material and said additional coating of glassy particulate material are the same.

6. The method of claim 4 wherein the compositions of the coating of particulate material are such that the refractive index of the inner portion of said body is greater than that of the outer portion of said body.

7. The method of claim 6 further comprising the step of heating the body so formed to consolidate said particulate material.

8. The method of claim 7 further comprising the steps of
   heating the preform body to the drawing temperature of the material thereof, and
   drawing said preform into an optical fiber.

9. The method of claim 1 further comprising the step of rotating said starting member while said particulate material is being applied.

10. The method of claim 1 wherein the step of applying particulate material comprises applying material having a density greater than 0.4 gr/cc.

11. An apparatus for forming a continuous length of article comprising
    an elongated mandrel,
    means for applying particulate material to the exterior surface of said mandrel,
    means for reciprocatingly moving said means for applying along at least a portion of the length of said mandrel to form a hollow porous article, and
    means for indexing said article in a stop-and-go fashion with respect to said mandrel, whereby said article remains in a longitudinally fixed position with respect to said mandrel between brief periods during which said article is longitudinally moved to its next position with respect to said mandrel.

12. The apparatus of claim 11 wherein said means for applying particulate material is at least one burner.

13. The apparatus of claim 12 further comprising at least one additional burner longitudinally separated from said at least one burner for depositing particulate material onto the coating formed by said at least one burner.

14. The apparatus of claim 13 wherein said mandrel comprises a conically tapered section and a cylindrical section, the narrow end of said conical section being connected to said cylindrical section.

15. The apparatus of claim 14 further comprising means for heating the porous article to a temperature sufficient to consolidate said particulate material.

16. The apparatus of claim 15 further comprising
    means for heating the porous article to the drawing temperature of the material thereof, and
    means for drawing said porous article into an optical fiber.

17. The apparatus of claim 16 further comprising means for cooling said mandrel.

18. The apparatus of claim 17 wherein the thermal coefficient of expansion of said mandrel is greater than 1.5 times that of the particulate material which is to be applied thereto.

* * * * *